United States Patent

[11] 3,596,978

[72] Inventors Henry W. Wessells, III
 Paoli;
 Walter S. Eggert, Jr., Huntingdon Valley,
 both of, Pa.
[21] Appl. No. 842,314
[22] Filed July 16, 1969
[45] Patented Aug. 3, 1971
[73] Assignee The Budd Company
 Philadelphia, Pa.

[54] COMBINED A-POST, COWL AND WHEELHOUSE STRUCTURE
 3 Claims, 4 Drawing Figs.
[52] U.S. Cl. .............................................. 296/28 R
[51] Int. Cl. .......................................... B62d 21/00
[50] Field of Search ............................................ 296/28,
 28.4, 28.5; 180/68; 280/152

[56] References Cited
UNITED STATES PATENTS

| | | | |
|---|---|---|---|
| 1,855,429 | 4/1932 | Toncray ........................ | 296/28 (.5) |
| 2,234,781 | 3/1941 | Schjolin ........................ | 296/28 |
| 3,188,132 | 6/1965 | Schwiering et al. ............ | 296/28 |
| 3,202,451 | 8/1965 | Auger et al. ................... | 296/28 |

FOREIGN PATENTS

| | | | |
|---|---|---|---|
| 469,584 | 3/1952 | Italy ............................. | 296/28 |

Primary Examiner—Benjamin Hersh
Assistant Examiner—Leslie J. Paperner
Attorneys—Thomas I. Davenport, Edward M. Farrell, John B. Sowell, Alford L. Trueax, Jr. and William R. Nolte ABSTRACT: A motor vehicle structure which provides for a more shallow A-post structure and a reinforced inner wheelhouse panel for joining to the A-post and transferring loading and shock stresses from the wheels or front end to the A-post. The dash panel, cowl, inner wheel housing and A-post structure forming an open box structure across the front of the passenger compartment.

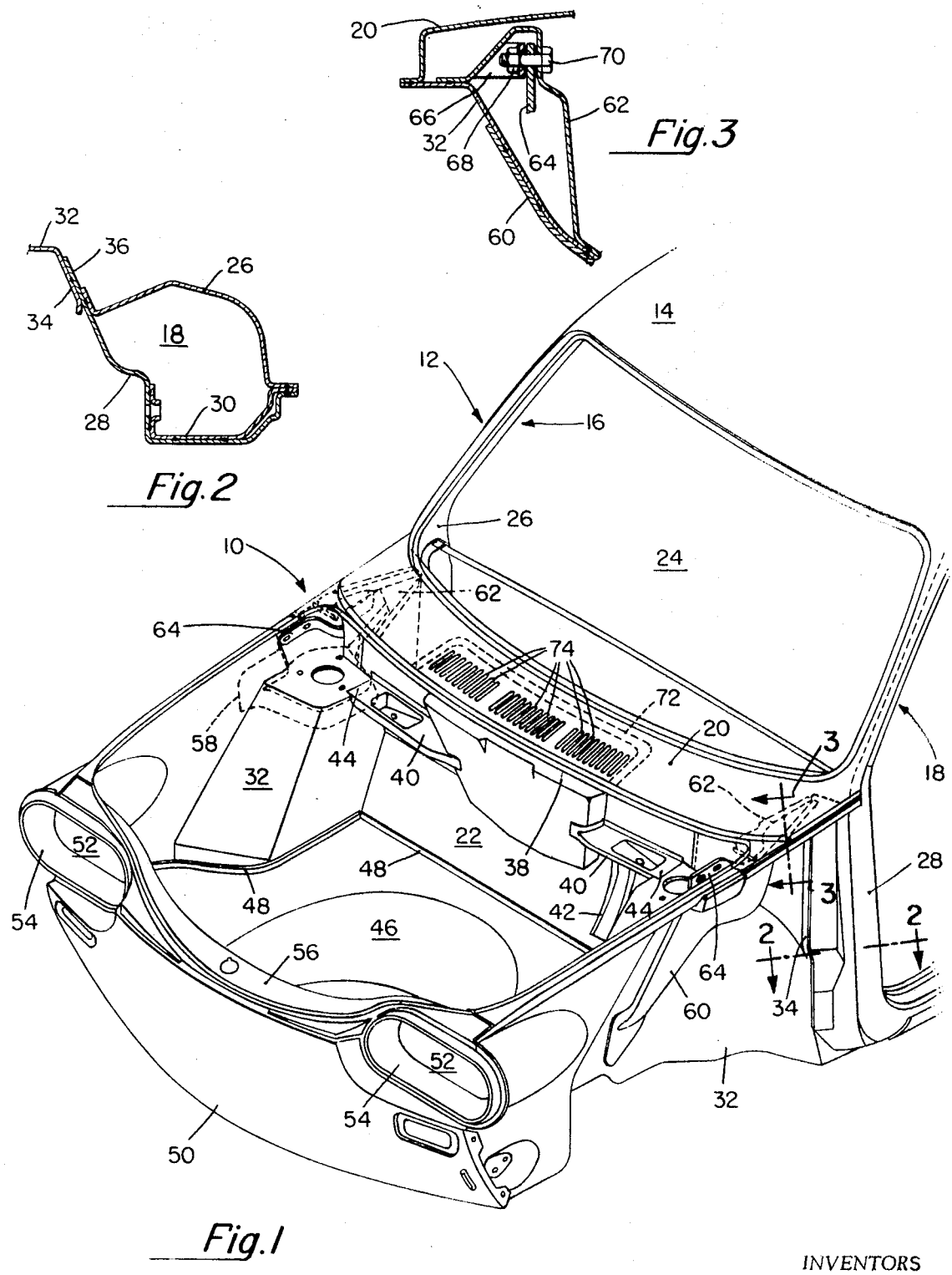

COMBINED A-POST, COWL AND WHEELHOUSE STRUCTURE

This invention deals with a motor vehicle body structure and more particularly with a body structure from the A-post forward.

Unitized vehicle body construction generally are provided with a double metal thickness between the A-post and the front end structure or a wider A-post structure forward of the door opening. In this novel vehicle structure it is an object to provide a single metal thickness with a diagonal reinforcement bracket and a reinforcing hinge bracket for directing stresses imposed on the inner wheelhouse panel into a relatively narrow A-post structure.

A further object is to provide a cowl section combined with the dash panel, inner wheelhouse panels and the A-post structure to form an open box structure extending across the front of the passenger compartment and providing structural rigidity to the front of the vehicle body.

These and other objects of this invention will become apparent as reference is made to the following specification and drawings wherein:

FIG. 1 is a perspective view of the front end of a vehicle body with portions of the outer sheet metal removed to show the novel body structure of this invention.

FIG. 2 is a view in the direction of the arrows substantially along the line 2-2 of FIG. 1 illustrating the A-post structure and overlapping joint between the A-post and the inner wheel housing.

FIG. 3 is a view in the direction of the arrows substantially along the line 3-3 of FIG. 1 illustrating the manner in which the roof panel, inner wheel housing, front hood hinge bracket and front shock absorber bracket are assembled.

Figure 4:
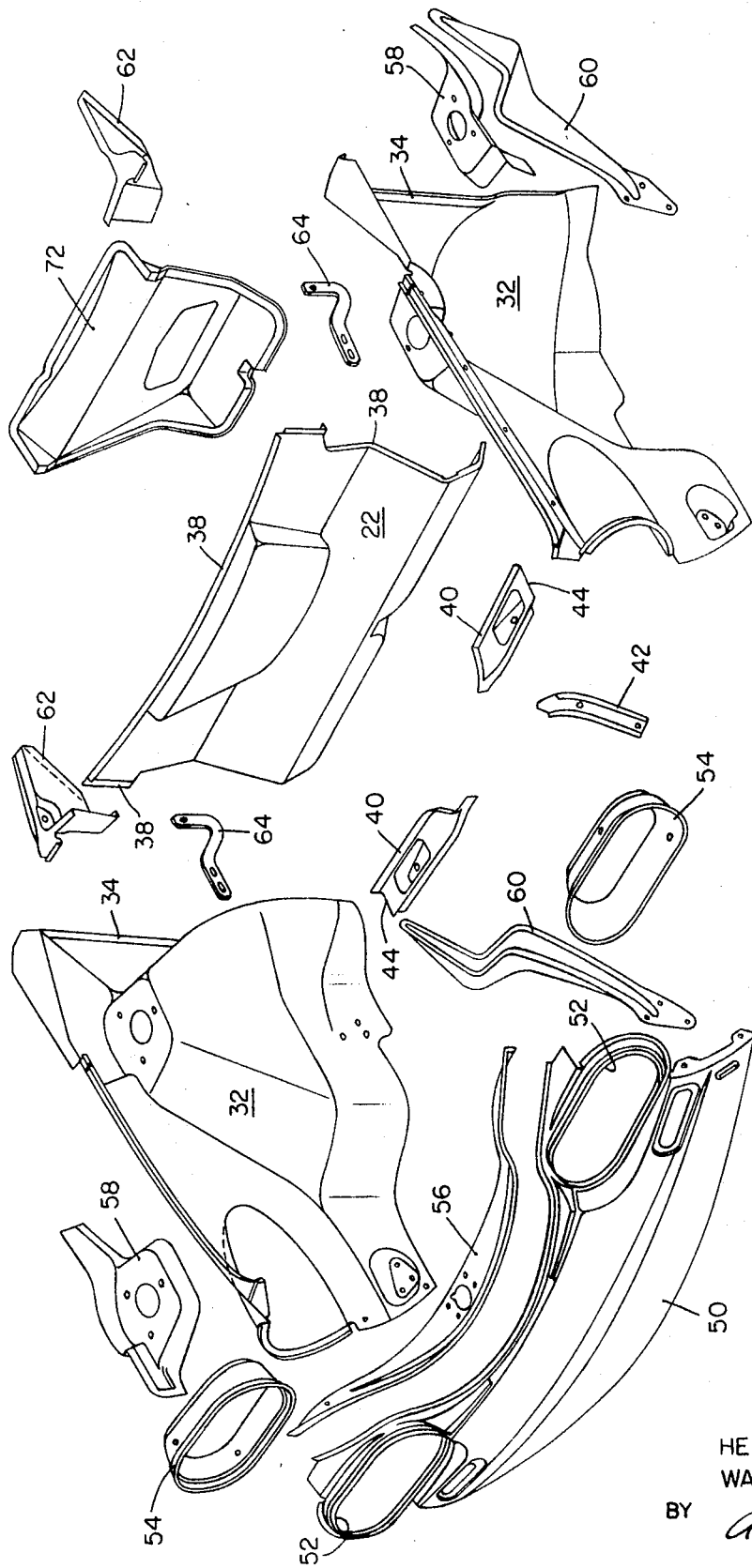
FIG. 4 is an exploded perspective view of the front end structure forward at the A-post.

Referring now to the drawings, as best seen in FIG. 1, the front end 10 of a vehicle body 12 includes a roof panel 14 which extends forwardly over the A-posts 16, 18 and having a cowl section 20 thereof over the dash panel 22. The cowl section 20, A-post sections 16 and 18 and main roof panel 14 define an opening 24 for accommodating a windshield (not shown).

The A-posts, as best seen in FIGS. 1 and 2, are fabricated from portions of the uniside panels and a reinforcing plate. The A-post includes the inner uniside panel 26, outer uniside panel 28 and hinge reinforcement plate 30.

Extending forwardly of the A-posts 16 and 18 on each side of the front end 10 is an inner wheel housing panel 32 having a rearwardly extending attaching flange 34 for being secured to a forwardly extending attaching flange 36 of each of the outer uniside portion of the A-posts, as best seen in FIG. 2.

The dash panel 22 has an attaching flange 38 extending on all edges thereof for securing the upper edge of the dash panel to the cowl section 20, the side edges to the adjacent inner wheel housing panels 32 and the lower edge to the floor pan (not shown) of the main vehicle body.

Attached to the front of the dash panel 22 as by welding are a pair of dash panel reinforcements 40 and a steering bracket reinforcement 42. A flange 44 extends along the side edges of each dash panel reinforcement 40 for welding to the adjacent inner wheelhouse panel 22 for further strengthening of the open box structure.

A front floor pan 46 is positioned between the inner wheelhouse panels 32 and forward of the dash panel 22. The attaching flange 48 extends about the outer edge thereof for securing the front floor pan 46, as by welding, to the adjacent dash panel 22, inner wheelhouse panels 32 and to a front lower panel 50 which extends between and is secured to the front ends of the inner wheelhouse panels for forming a front open box structure for receiving a spare tire and wheel and/or luggage, as desired.

The front lower panel 50 has a headlight opening 52 on each side thereof to accommodate the headlight housings 54 secured therein. Secured across the top of the front lower panel 50 is a front hood lock reinforcement panel 56 for supporting the front hood lock (not shown) and reinforcing the top of the front lower panel.

As best seen in FIG. 1, a front shock absorber bracket 58 is secured to each inner wheelhouse panel 32 for strengthening the panel at the point of attachment of the front shock absorbers (not shown). A side reinforcement bracket 60 is attached to each inner wheelhouse panel 32 and extends diagonally rearwardly toward the upper rear corner of the inner wheelhouse panel and forwardly toward the area where the front axle support of the vehicle is attached to the front body structure for directing the shock and loading forces imposed thereon across the inner wheel panel to the attached A-post structure.

Secured to the upper corner of the dash panel 22 and connected to the adjacent inner wheelhouse panel 32 is a pair of front hood hinge brackets 62 with each of the brackets pivotally supporting a front hood hinge arm 64. The hinge brackets also strengthens the inner wheelhouse panel 36 and assists in the transfer of loading applied to the inner wheelhouse panel to the A-post structure. The front hood hinge arms 64 support the front hood (not shown) for closing the open box structure formed by the dash panel 22, front wheel-housing panels 32, front floor pan 46 and the front lower panel 50.

As best seen in FIG. 3, each front hood hinge bracket 62 is provided with an inner bracket 66 having a weld nut 68 secured thereto for receiving the hinge pintle 70 for pivotally supporting the hood hinge arm 64.

A cowl intake plenum 72 is attached to the dash panel below the louvers 74 of the cowl section 20 for receiving fresh air and directing such air into the interior of the vehicle body.

Thus, it can be seen that with this novel body structure more leg room is provided forward of the A-post without using a double-wall construction. The hinge brackets 62 and the side reinforcement brackets 60 effectively reinforce the inner wheelhouse panels 32 and transfer loading and shock imposed thereto into the A-post structure.

We claim:

1. In a vehicle body having a pair of fabricated A-posts, a front end assembly extending forwardly of said A-posts and joined to said A-posts, and a cowl structure connected to said A-posts and said front end assembly, said front end assembly including a pair of inner front wheelhousing panels, each of said wheelhousing panels having a first attaching flange extending toward and attached to said adjacent A-post for securing said front end assembly to said A-posts, a second attaching flange extending adjacent said cowl structure and being attached thereto, and a formed diagonal side reinforcement bracket secured to the central section of each of said front wheelhousing panels for reinforcing said panels and distributing loadings imposed thereon to said A-posts.

2. In a vehicle body having a pair of fabricated A-posts, a front end assembly extending forwardly of said A-posts and joined to said A-posts, a cowl structure connected to said A-posts and said front end assembly, said front end assembly including a pair of inner front wheel housing panels, each of said wheel housing panels having a first attaching flange extending toward and attached to said adjacent A-post for securing said front end assembly to said A-posts, a second attaching flange extending adjacent said cowl structure and being attached thereto, a dash panel extending between said front wheel housings forwardly of said A-posts, said dash panel having a flange extending from each edge adjacent said wheel housing panels and being secured to said wheel housing panels thereby, and a hinge bracket secured to each upper corner of said dash panel and to the adjacent inner wheeelhouse panel for supporting a hinge arm and reinforcing said adjacent wheelhouse panel.

3. A vehicle body structure as claimed in claim 2 having said cowl structure secured to an upper flange of said dash panel for forming an open box structure with said dash panel, said A-posts and said front wheel housing panels.